Patented May 20, 1941

2,242,446

UNITED STATES PATENT OFFICE 2,242,446

VAT DYESTUFFS OF THE ANTHRAQUINONE-ACRIDONE-CARBAZOLE SERIES

Wilhelm Bauer, Leverkusen-Wiesdorf, Germany, assignor to General Aniline & Film Corporation, a corporation of Delaware No Drawing. Application April 16, 1938, Serial No. 202,447. In Germany May 7, 1937

1 Claim. (Cl. 260—277)

My present invention relates to new valuable vat dyestuffs of the anthraquinone-acridone-carbazole series.

My new compounds correspond to the following general formula

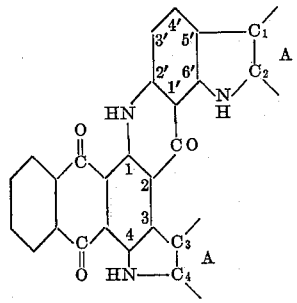

wherein A indicates that the carbon atoms designated by $C_1$ and $C_2$ on the one hand and $C_3$ and $C_4$ on the other hand are members of an anthraquinone and wherein the positions designated by 3' and 4' bear hydrogen or halogen atoms or alkoxy, for instance methoxy or ethoxy, or alkyl groups.

The new dyestuffs are obtained by causing acid condensing agents to react with anthraquinone-2.1-N-1'.2'-N-benzene-acridones which contain an α-amino-anthraquinone radical in each of the 4- and 6'-positions and which have in each nucleus one free o-position with respect to the imino groups. As a modification these o-positions may be wholly or partially replaced by substituents which do not prevent ring closure. The reaction products thus obtained can be subjected to an after-oxidation treatment. The following formula shows the nature of the starting materials

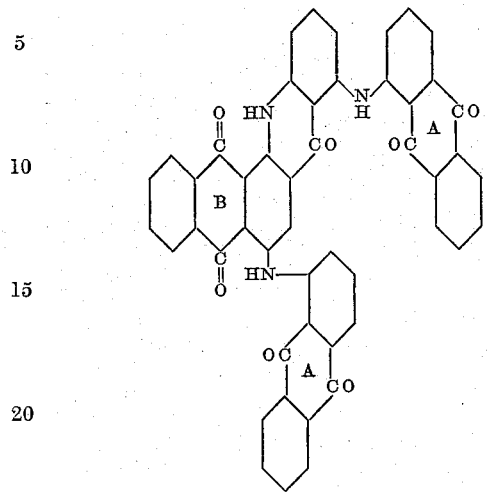

In this formula the anthraquinones designated by the symbol A may contain substituents, for instance halogen atoms or aroyl-amino groups, especially benzoyl-amino groups, the 2-position of the radicals A, the 3-position of the radical B and the 5'-position of the benzene-acridone being unsubstituted or containing substituents which do not prevent ring closure. It may be pointed out that, for instance, a halogen atom in the 5'-position of the benzene nucleus does not prevent ring closure as it is eliminated during the reaction in the form of hydrogen halide. The 3'- and 4'-positions of the benzene nucleus may be substituted as indicated in the above general formula of the final products.

The dianthraquinonyl-diamino-anthraquinoneacridones serving as starting materials are obtainable, for instance, by the reaction of 4.6'-dihalogen-anthraquinone-benzene-acridones with corresponding α-amino-anthraquinones.

As suitable condensing agents there may be employed anhydrous aluminium-chloride in the presence of organic solvents such as nitrobenzene, furthermore concentrated sulfuric acid or chloro-sulfonic acid. In case the 5'-position of the benzene nucleus is unsubstituted the condensation with aluminium-chloride in nitrobenzene occurs rapidly at temperatures of 100–115° C. If the 5'-position of the benzene nucleus contains a halogen atom either the temperature will have to be raised to about 140–150° C. or the heating at a lower temperature, say about 115–120° C., will have to be continued for a period of about 10 hours. The reaction occurs in such a manner that at first intermediate products of a higher hydrogen content are formed which are soluble in concentrated sulfuric acid with a blue coloration and which can be converted into the final products by means of suitable oxidizing agents, for example sodium hypochlorite solution. The final products thus obtained are soluble in concentrated sulfuric acid with a reddish violet coloration. If the anthraquinone radicals A are substituted by aroyl-amino groups in an α-position and the 5'-position of the benzene nucleus is unsubstituted the condensation is advantageously carried out with concentrated sulfuric acid or chloro-sulfonic acid. Also in this case, if working at room temperature, there are first formed intermediate products which are converted by heating the reaction mixture to 50–80° C. into the final products, sulfuric dioxide being split off thereby. If aroyl radicals are saponified during the condensation they can easily be reintroduced by subjecting the final products to an after-treatment with aroylating agents.

My new dyestuffs thus obtained are, generally speaking, dark powders, insoluble in water, organic solvents, or diluted mineral acids. They are soluble in concentrated sulfuric acid with a reddish violet coloration which turns blue if aroyl-amino groups are present in an α-position in the anthraquinones. On treating with an alkaline hydrosulfite solution they yield an easily soluble yellowish brown vat, from which the fiber is dyed clear mostly yellowish brown khaki-colored shades. If desired, the tint of the dyestuffs can be improved by means of the usual brightening agents. Thus, for instance, the dyestuffs can be purified by dissolving the same in concentrated sulfuric acid diluting the solution with water until a sulfuric acid content of about 80.5 per cent is reached, removing the precipitating sulfuric acid salts of the dyestuffs and regenerating therefrom the free dyestuffs by a treatment with water.

My new products are exceedingly suitable for the vat dyeing process and also for the printing of textiles, the dyeings and prints being distinguished by excellent fastness properties.

The following examples illustrate the invention, the parts being by weight:

*Example 1*

|  | Parts |
|---|---|
| 4.3'6' - trichloroanthraquinone - 2.1 - (N) - 1'.2'-(N)-benzene acridone | 42.8 |
| 1-aminoanthraquinone | 65 |
| Anhydrous potassium carbonate | 16 |
| Copper acetate | 3 |
| Naphthalene | 400 | are heated to 210° C. for 4 hours while stirring. After cooling to 100° C., the reaction mixture is diluted with 400 parts of chlorobenzene, whereupon the reaction product is filtered with suction, rinsed with organic solvents in order to remove the mother liquor, then rinsed with dilute hydrochloric acid to remove the inorganic salts and finally rinsed with water and dried. The anthrimide thus formed contains a chlorine atom in the 3'-position of the benzene acridone nucleus; it is soluble in sulfuric acid with a brown coloration which, on heating, turns red; on diluting the solution with water there precipitate olive flakes which dye from a violet vat even olive shades.

20 parts of the finely powdered anthrimide thus obtained are introduced into a solution of 60 parts of aluminium chloride in 200 parts of nitrobenzene.

On diluting a test portion of the green solution thus obtained with alcohol the coloration turns blue. On heating for about ½ hour to 110° C. it assumes a clear blue coloration; a test portion on dilution with alcohol turning reddish-violet. After pouring the melt into ice-water to which hydrochloric acid has been added, the nitrobenzene is blown off with steam and the filtered dyestuff is isolated and rinsed. A test portion taken therefrom is soluble in concentrated sulfuric acid with a blue coloration which after oxidation with sodium hypochlorite solution turns reddish-violet. The dyestuff thus obtained forms an easily soluble yellowish-brown hydrosulfite vat from which the fiber is dyed even clear khaki shades of excellent fastness properties. This dyestuff has the following structural formula:

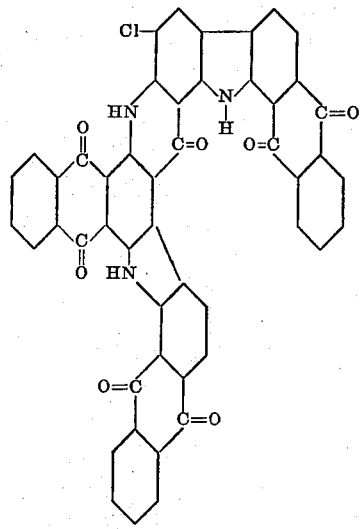

*Example 2*

|  | Parts |
|---|---|
| 3'5'6'.4 - tetrachloroanthraquinone - 2.1-(N)-1'.2'-(N)-benzene acridone | 45 |
| 1-aminoanthraquinone | 65 |
| Anhydrous potash | 16 |
| Copper acetate | 3 |
| Naphthalene | 450 | are heated to 210° C. while stirring. After 10 minutes' heating precipitation of the anthrimide occurs. After further heating for 4 hours to 210° C. the melt is diluted by means of 200 parts of hot o-dichlorobenzene, filtered with suction and the anthrimide is purified by rinsing with solvents as described in Example 1. The anthrimide thus obtained in the form of black needles corresponds to the formula given above and contains one chlorine atom in both the 3' and 5'-positions of the benzene nucleus. It is soluble in concentrated sulfuric acid with a yellowish-brown coloration. On pouring the solution into water there are separated reddish-violet flakes. On prolonged heating the sulfuric acid solution turns dark-brown and separates greyish-blue flakes on the addition of water.

40 parts of the dianthrimide thus obtained are introduced into a hot solution of 120 parts of aluminum chloride and 400 parts of nitrobenzene. On diluting with alcohol a test portion of the green solution thus formed turns greenish-blue. By heating to 140–145° C. the solution gradually becomes darker, hydrogen chloride being evolved at the same time. After about 1 hour it has turned dark blue, a test portion diluted with alcohol assuming a dull red-violet coloration. Heating to 145° C. is continued for about ½ hour, whereupon the solution is cooled, poured into acidified ice water and worked up as described in Example 1. The dyestuff thus obtained is identical with that obtained according to Example 1. It forms a dark powder which is soluble in concentrated sulfuric acid with a blue coloration, the color being reddish-violet if the dyestuff has been subjected to a pretreatment by means of dilute sodium hypochlorite solution. It yields an easily soluble hydrosulfite vat, the fiber being dyed therefrom clear khaki shades of good fastness properties. The shades are identical with those obtained according to Example 1. This dyestuff has the following structural formula:

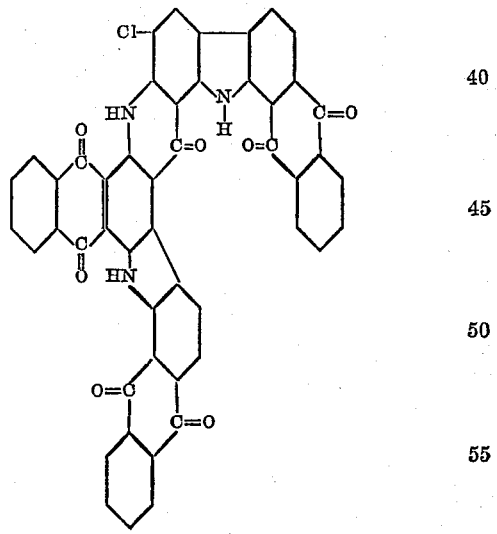

I claim:
The compound of the following formula

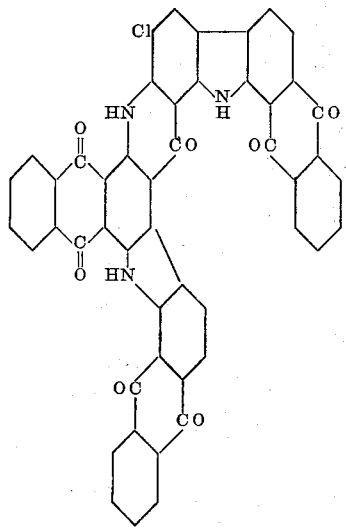

WILHELM BAUER.